Patented Jan. 26, 1954

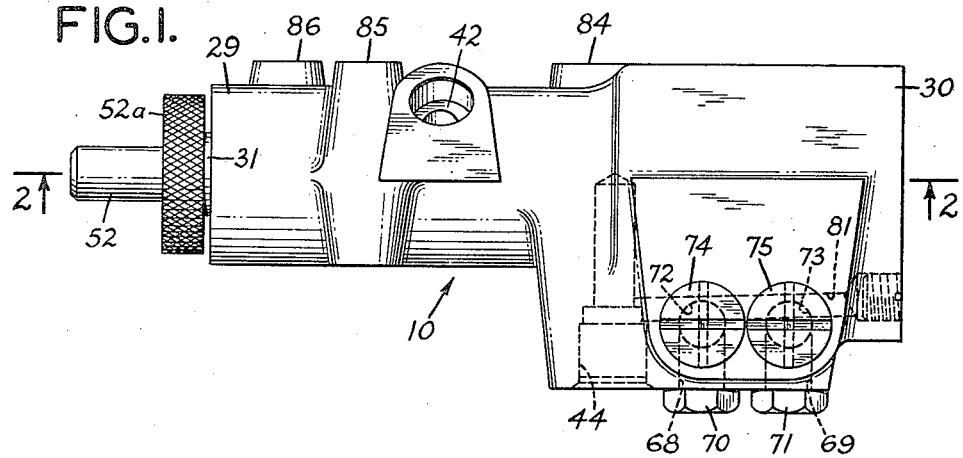
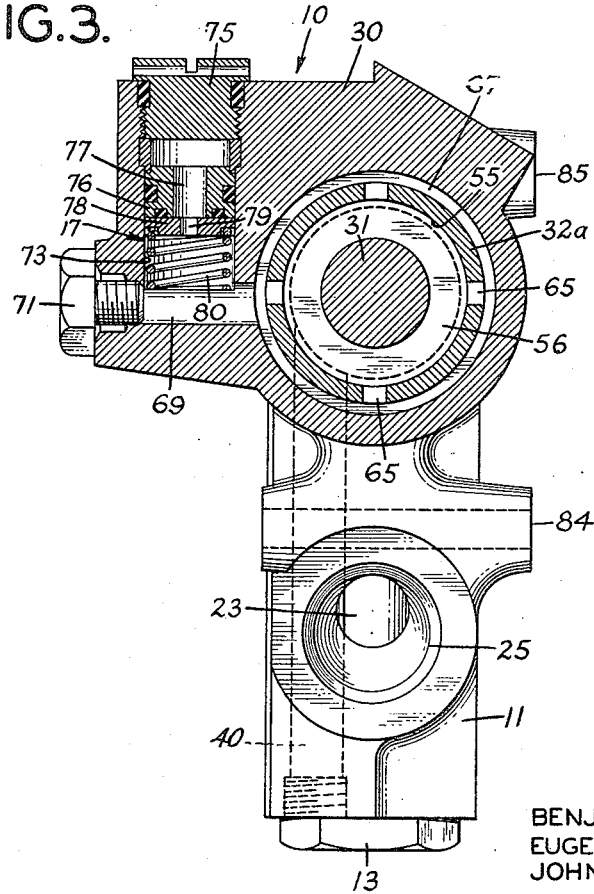

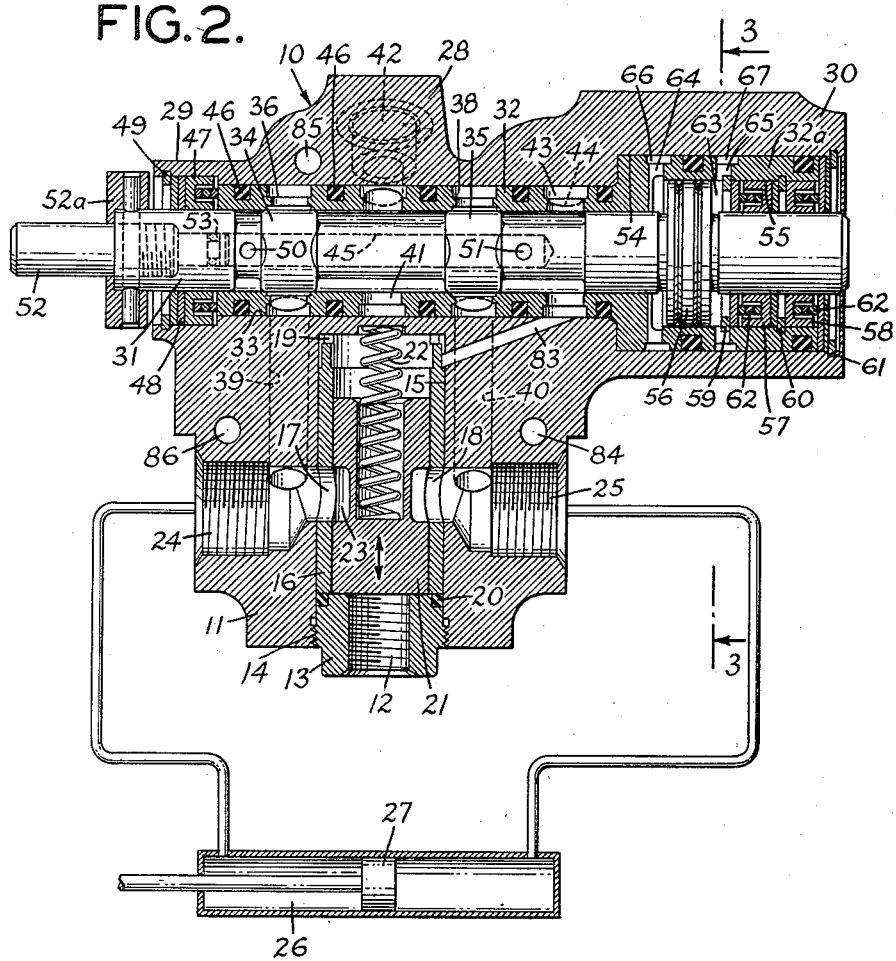

2,667,181

UNITED STATES PATENT OFFICE 2,667,181

SLIDE SELECTOR VALVE

Benjamin N. Ashton and Eugene V. Barkow, Kingston, and John P. Frain, Mount Tremper, N. Y., assignors to Electrol Incorporated, Kingston, N. Y., a corporation of Delaware Application December 3, 1947, Serial No. 789,504

3 Claims. (Cl. 137—622)

This invention relates to improvements in valves, and it relates particularly to an improved form of selector valve of the type used in controlling the operation of hydraulically actuated devices, such as, for example, hydraulic jacks and motors of a type used for actuating the wing flaps of landing gear of aircraft and for other purposes.

Selector valves of the type commonly used heretofore in hydraulic systems for aircraft usually are of the poppet type, the poppets being actuated by a cam member to reverse the direction of flow of liquid in the system in order to reverse the direction of movement of a hydraulic jack or the like. Some of these valves are associated with a dump valve, whereby the liquid in the system may be discharged in order to permit movement of the hydraulic jack or motor, for example, by gravity when used in the actuation of retractable landing gear. Such combined selector and dump valves are relatively complicated and usually are very expensive to manufacture for the reason that they must be of the pressure balanced type to permit them to be actuated readily when used in systems developing as much as 1500 to 1650 pounds per square inch pressure.

An object of the present invention is to provide a simplified form of selector valve including a dampened plunger type valve.

Another object of the present invention is to provide an improved form of selector valve which is automatically actuated to permit free circulation of liquid in the hydraulic system upon event of pressure failure or pump failure in the system.

A further object of the invention is to provide a plunger type selector valve which has a movement dampener thereon to dampen the movement of the plunger.

A further object of the invention is to provide a selector valve which is self-compensating for leakage.

Other objects of the invention will become apparent from the following description of a typical form of selector valve embodying the present invention.

In accordance with the present invention, we have provided a selector valve which includes a slidable plunger for selectively opening and closing the ports through which liquid is delivered from a source of pressure to a jack or other operating mechanism and for returning fluid to the source from such jack or other mechanism. More particularly, the plunger of the selector valve is provided with a movement dampening device which cushions the movement of the selector valve and thereby prevents the high pressure in the system from jarring and rapidly shifting the plunger or slide valve in its movement.

Another feature of the invention is the provision of a pressure-responsive valve element which automatically connects the jack or other device to the selector valve when the system is under pressure but disconnects the jack from the source of pressure and allows free flow of fluid from one end of the jack or other device when the pressure in the system drops below a predetermined minimum. This latter feature of the valve permits manual or gravity operation of the jack or other motor so that when the valve is used, for example, for controlling the retractable landing gear of aircraft, the landing gear may be lowered by gravity if the hydraulic system should be damaged or otherwise rendered ineffective.

For a better understanding of the present invention, reference may be had to the accompanying drawing, in which:

Figure 1 is a plan view of the typical valve embodying the present invention;

Figure 2 is a view in section taken on line 2—2 of Figure 1 with a hydraulic jack shown diagrammatically as connected to the two connection ports of the valve; and Figure 3 is a view in section taken on line 3—3 of Figure 2.

The form of the invention chosen for purposes of illustration and disclosed in the drawing includes a valve casing 10 of irregular shape having a depending portion 11 which is provided with a port 12 which is adapted to be connected to a source of fluid under pressure. The port 12 may be formed in an annular nut member 13 which is internally threaded to receive a conduit and is provided with external threads 14 for connecting it to the walls of a bore 15 in the depending portion 11 of the casing. The threaded member 13 is also used to support within the bore 15 a sleeve member 16 which is provided with a pair of lateral openings 17 and 18, and a notched upper end 19 of reduced external diameter which permits the flow of liquid through the notches and around the upper end of the sleeve.

The sleeve 16 and the member 13 may have an interposed gasket or sealing ring 20 for preventing leakage around them.

Mounted within the sleeve 16 is a piston or plunger member 21 of shorter overall length than the sleeve 16 so that it may be displaced upwardly by the pressure of the liquid at the port 12. The plunger 21 is normally urged downwardly by means of a spring 22 to align a port 23 extending therethrough with the openings 17 and 18 of the sleeve 16. When the plunger is in the position shown, it permits the flow of liquid from either the connection port 24 to the connection port 25 in the valve casing portion 11, or vice versa. The ports 24 and 25, as shown diagrammatically in Figure 2, are adapted to be connected to the opposite ends of hydraulic jack 26 or other device to cause movement of the piston 27 therein.

When the piston 21 is forced upwardly by the pressure of fluid in the port 12, the port 23 in the piston is moved out of alignment with the openings 17 and 18 in the sleeve and thereby prevents flow of liquid directly between the connection ports 24 and 25. When the piston is in the elevated position, the fluid supplied to the jack 26 must flow through a selector valve, described hereinafter. When the pressure at the port 12 fails, the piston 21 moves to the position shown, and free flow of liquid is permitted from one end of the jack to the other so that the piston 27 may be moved manually or by gravity with respect to the cylinder 26.

The selector valve mechanism is mounted in the upper portion 28 of the casing, which, as illustrated, may include a semi-cylindrical left-hand section 29, as viewed in Figure 1, and a generally square or polygonal portion 30 at the right-hand end.

The casing sections 29 and 30 receive the selector valve mechanism by means of which fluid under pressure is delivered selectively to the connection port 24 or the connection port 25 with return flow from the jack 26 or to the device through the opposite connection port.

The selector valve disclosed herein is of the slide type including a manually movable plunger 31 which is slidable for axial movement in a sleeve member 32 which is mounted in a bore 33 extending lengthwise through the casing sections 29 and 30.

The slide or plunger member 31 has a pair of generally cylindrical valve plug elements 34 and 35 thereon for cooperation with generally radially directed ports 36 and 38 in the sleeve 32 which are in communication with the passages 39 and 40 extending down and opening into the connection ports 24 and 25, respectively.

The sleeve 32 is further provided with a centrally located series of passages 41 which communicate with a port 42 which is connected in parallel with the pressure port 12 to the pressure side of a source of pressure.

To the right of the ports 38 are a series of ports 43 in the sleeve 32 which communicate with a return port 44 in a laterally projecting extension from the casing section 30. The port 44 is adapted to be connected to the low pressure side of the pump or other source of pressure for discharge of liquid therethrough. So much of the valve as is described above operates as follows: When fluid pressure is applied to the port 12 and the port 42, the plunger 21 is displaced upwardly, thereby disconnecting the ports 24 and 25 from each other. With the plunger 31 in the position shown, the valve plug portions 34 and 35 prevent the flow of liquid from the pressure port 42 to either of the passages 39 or 40, and, for that reason, the jack 26 is maintained in whatever position it may have assumed, the fluid being trapped or locked on opposite sides of the piston 27. If the plunger 31 is now moved to the left by pushing on the right-hand end of the plunger, the port 36 is uncovered by the plug 34 which moves to the left and the port 38 is also uncovered but is separated from the pressure port 42 by the valve plug 35 being interposed between them. Under these conditions, liquid will flow from the port 42 into the sleeve 32 through the radial ports 36 in the sleeve, through the passage 39 into the connection port 24, thereby tending to displace the piston 27 to the right. Such movement of the piston forces the liquid on its right-hand side outwardly through the connection port 25, through the passage 40 into the sleeve 32 to the right of the displaced plug 35 and out through the radial passages 43 in the sleeve to the return port 44 and thence to the low pressure side of the system. So long as the plunger 31 is displaced to the left, as described, pressure will be maintained on the left-hand side of the piston, and it will continue to move toward the right until it reaches its limit of travel.

If the piston is to be moved toward the left, the plunger 31 may then be moved toward the right by pressing on its projecting left-hand end which causes the plunger to move from the position shown to displace the valve plugs 34 and 35 to the right beyond their cooperating ports 36 and 38. In this position, fluid under pressure will flow in through the port 42 into the sleeve 32, out through the radial passages 38, through the passage 40 and to the connection port 25, for delivery to the right-hand end of the jack 26, thereby forcing the piston to the left. The fluid at the left-hand side of the piston 27 flows through the connection port 24, the passage 39, the radial ports 36 in the sleeve 32, through the central passage 45 in the plunger 31 to the interior of the sleeve 32 near the radial ports 43 at the right-hand end of the sleeve, and out through the return port 44. When the piston 27 has been displaced a desired amount, the plunger is moved to the position shown, whereby the flow of liquid into the piston through either connection port is avoided.

The valve embodying the present invention may be provided with suitable seals therein to prevent leakage, for example, between the sleeve 32 and the wall of the bore 33. Thus, suitable sealing rings 46 are provided on opposite sides of each of the sets of radial ports 36, 38, 41 and 43. Also, at the left-hand end of the sleeve 32, as shown in Figure 2, a U-shaped ring seal 47 is provided having a spacer ring therein bearing against the end of the sleeve 32 and retained in position by means of one or more shims 48 and a snap ring 49.

The plunger 31 and the passage 45 therein may be formed by drilling the plunger 31 axially to form the passage 45 and then drilling it transversely on opposite sides or outwardly of the plugs 34 and 35 to provide ports 50 and 51 permitting flow of liquid from one end of the plunger to the other past the valve plugs 34 and 35. The end of the passage 45 may be sealed by threading into it a projecting plunger member 52 which may be provided with a suitable seal 53 to prevent leakage between the plunger 31 and the projecting portion 52. A lock member and stop 52a may be pinned to the plunger 31 and plunger member 52.

The valve, as disclosed, is suitable for many purposes, but for high pressure operation, it often is desirable to provide a dampening device for cushioning and retarding the movement of the plunger. Therefore, as shown in the drawings, the right-hand end 32a of the sleeve 32 may be of larger diameter than the remainder and this enlarged diameter portion is received in an enlarged bore portion 54 in the casing portion 31. The right-hand end 32a of the sleeve 32 has an enlarged diameter bore 55 thereon for receiving a piston 56 which acts as a dampening means with the structure described hereinafter. Leakage around the projecting end of the plunger 31 is prevented by means of suitable U-shaped ring seals 57 and 58 which are held in position by means of a series of snap rings 59, 60 and 61 and suitable spacer rings 62. The U-shaped rings 57 and 58 are interposed between and bear against the inner surface of the sleeve portion 32a and the outer surface of the plunger 31.

The piston 56 is received in a cylinder space 63 so that it is capable of limited movement to the right and left a sufficient distance to permit valve plugs 34 and 35 to at least partially uncover their cooperating ports 36 and 38.

On opposite sides of the piston 56 are radial passages 64 and 65 which communicate with grooves 66 and 67 in the exterior of the sleeve portion 32a. These grooves 66 and 67 are in communication with passages 68 and 69 (Figure 1) which extend outwardly in the casing section 20 and are closed at their outer ends by means of suitable plugs 70 and 71 which are used to "bleed" air from the valve.

As best shown in Figure 3, the passages 68 and 69 communicate respectively with vertical bore portions 72 and 73 which are closed at their upper ends by means of sealing plugs 74 and 75. The bore 73 is provided with a sleeve member 76 having a passage 77 therein which cooperates with a check valve member 78 of polygonal cross-section having a small passage 79 through its center. The valve plug 78 is urged upwardly against the lower end of the sleeve 76 in sealing relation thereto by means of a spring 80 mounted below it in the bore 73. Thus, when the piston 56 and the plunger 31 are moved to the right, liquid can escape from between the piston 56 and the right-hand end of the cylinder space 63 only through the passage 79 in the valve plug 78 and upwardly through the passage 77 in the sleeve 76. The upper ends of the two passages 72 and 73 are connected by means of a transverse passage 81 which also communicates with the return port 44 so that the passage 81 is always filled with liquid. The liquid can escape to the cylinder space on the opposite side of the piston 56 through the passage 72 which is also fitted with the check valve device like that described above. In this case, as the liquid flows from the passage 77 through the passage 81 into the bore 72, the check valve member therein is unseated permitting the liquid to flow into the space to the left of the piston 56.

If the piston 56 is pushed to the right, its movement is retarded by the check valve and dampener arrangement in the passage 73, while liquid can flow freely past the check valve dampener in the passage 72 to the opposite side of the piston. Movement of the plunger either to the right or left, therefore, is dampened by the action of the piston 56 and the cooperating check and dampening valve arrangements described above to prevent chattering of the valve or abrupt movement of the valve to the right or left.

The valve construction described above may be provided with other passages for minimizing the effect of leakage in the valve. For example, leakage past the piston 21 or the sleeve 16 can be taken care of by means of an inclined passage 83 extending from adjacent the upper end 19 of the sleeve and communicating with the return port 44. Also, suitable sealing rings may be interposed between the sleeve portion 32a and the wall of the enlarged passage or bore 55.

The above-described construction has the advantage that various portions, such as the sleeve 32, 32a and the plunger and dampening piston may be a one piece construction, thereby facilitating manufacture and assembly of the valve. The dampener construction of the valve is an integral part of the valve, and thus additional connections for dampening the action of the valve are not required.

Inasmuch as the dampener mechanism is connected to the return port of the valve, compensation for leakage in the dampener is accomplished automatically. Moreover, the arrangement of parts permits the amount of overlap of the valve plugs 34 and 35 and their cooperating seats or passages 36 and 38 to be reduced to a relatively small amount so that relatively short movements of the plunger 31 will control the movements of the device to be operated thereby.

Moreover, the provision of the piston valve 21 renders the device fully responsive to the pressure in the system so that should pressure be lost due to damage of any of the hydraulic lines, it is still possible to operate the jack 26 or other device manually or by gravity, a feature which is highly desirable in actuating mechanisms for retractable landing gear and the like.

It will be understood that the shape and size of the valve may be modified as the purpose demands and that more than one such selector valve unit may be provided in a single casing. Also, the shape of the valve casing and the openings 84, 85 and 86 through the casing for securing the valve to an instrument panel or the like may be varied widely, as desired. Therefore, the form of the invention disclosed herein should be considered as illustrative and not as limiting the scope of the following claims.

We claim:

1. A selector valve comprising a casing having a bore therein and a fluid pressure port, a return port and a pair of connection ports, said pressure port, return port and connection ports being connected to said bore by passages spaced apart longitudinally of said bore, the passage from said pressure port being located between the passages from said connection ports, and said return port passage being on the opposite side of one of said connection port passages from said pressure port, a slide valve member in said bore having spaced apart valve elements thereon and a passage therethrough for selectively closing said connection port passages, said slide valve being movable axially of said bore to selectively connect one of said connection port passages to the pressure port passage and the return passage to the other connection port, means forming a cylinder in said bore, a piston on said slide valve member movable in said cylinder, an enlargement on one side of said casing adjacent to said cylinder, substantially parallel passage means in said enlargement connecting a portion of said cylinder on one side of said piston to a portion of the cylinder on the other side of said piston, and opposed check valves in said passage means, each of said check valves having a leak port therethrough for retarding flow of fluid from one side of said piston to the other and means connecting said passage means to a source of supply consisting of a connection to said return port.

2. A selector valve comprising a casing having a bore therein, a fluid pressure port, a return port and a pair of connection ports, a sleeve mounted in said bore having ports spaced longitudinally thereof communicating with said fluid pressure port, said return port and said connection ports, said sleeve further having a cylinder portion adjacent one end thereof, a slide valve member movable axially in said sleeve and having a pair of spaced apart valve plugs thereon for covering the ports communicating with said connection ports and movable selectively to connect either of said connection ports to said pressure port and the other connection port to said return port, a piston fixed to said slide valve member disposed in and movable axially of said cylinder portion, passages in said casing connected to each other and to said cylinder on opposite sides of said piston, means interconnecting said passages with a source of supply consisting of a connection to said return port, and opposed check valves provided with leak ports in said passages for retarding movement of said piston and said slide valve member.

3. A selector valve comprising a casing having a fluid pressure port, a return port and a pair of connection ports, said casing further having a cylinder portion adjacent one end thereof, a slide valve member movable axially in said casing for covering and uncovering the ports selectively to connect either of said connection ports to said pressure port and the other connection port to said return port, a piston fixed to said slide valve member disposed in and movable axially of said cylinder portion, passages in said casing connected to each other and to said cylinder portion on opposite sides of said piston, means connecting said passages to a source of supply consisting of a connection to said return port, and opposed check valve means each having a valve plug provided with a leak port in said passages for retarding movement of said piston and said slide valve member in opposite directions.

BENJAMIN N. ASHTON.
EUGENE V. BARKOW.
JOHN P. FRAIN.

References Cited in the file of this patent

UNITED STATES PATENTS

| Number | Name | Date |
|---|---|---|
| 772,115 | Thompson | Oct. 11, 1904 |
| 1,856,996 | Heise | May 3, 1932 |
| 2,036,955 | Padgett | Apr. 7, 1936 |
| 2,179,179 | Fischel | Nov. 7, 1939 |
| 2,283,541 | Dodson | May 19, 1942 |
| 2,366,382 | Burton | Jan. 2, 1945 |
| 2,403,519 | Gardiner | July 9, 1946 |